(12) United States Patent
Bae et al.

(10) Patent No.: US 7,962,138 B2
(45) Date of Patent: Jun. 14, 2011

(54) METHOD AND APPARATUS FOR MANAGING ROUTING AREA IN MOBILE COMMUNICATION SYSTEM

(75) Inventors: Eun-Hui Bae, Seoul (KR); Sung-Ho Choi, Suwon-si (KR); O-Sok Song, Suwon-si (KR); Beom-Sik Bae, Suwon-si (KR); No-Jun Kwak, Seoul (KR); Gert Jan Van Lieshout, Middlesex (GB)

(73) Assignee: Samsung Electronics Co., Ltd (KR)

( * ) Notice: Subject to any disclaimer, the term of this patent is extended or adjusted under 35 U.S.C. 154(b) by 853 days.

(21) Appl. No.: 11/703,599

(22) Filed: Feb. 7, 2007

(65) Prior Publication Data

US 2007/0202879 A1 Aug. 30, 2007

(30) Foreign Application Priority Data

Feb. 7, 2006 (KR) ........................ 10-2006-0011896

(51) Int. Cl.
*H04W 36/00* (2009.01)
(52) U.S. Cl. ..................... 455/436; 455/440; 455/435.1; 455/446; 455/456.1
(58) Field of Classification Search .................. 455/436, 455/435.1, 440, 446, 456.1
See application file for complete search history.

(56) References Cited

U.S. PATENT DOCUMENTS

| | | | |
|---|---|---|---|
| 5,960,345 A * | 9/1999 | Laatu ......................... | 455/435.1 |
| 6,765,890 B1 | 7/2004 | Palat et al. | |
| 6,859,653 B1 * | 2/2005 | Ayoub et al. ............... | 455/435.2 |
| 6,898,433 B1 | 5/2005 | Rajaniemi et al. | |
| 2004/0028005 A1 | 2/2004 | Rajaniemi et al. | |
| 2006/0135174 A1 * | 6/2006 | Kraufvelin et al. ........ | 455/456.1 |

FOREIGN PATENT DOCUMENTS

| | | |
|---|---|---|
| KR | 1020010053764 | 7/2001 |
| KR | 1020050054353 | 6/2005 |

* cited by examiner

*Primary Examiner* — Barry W Taylor
(74) *Attorney, Agent, or Firm* — The Farrell Law Firm, P.C.

(57) ABSTRACT

A method and apparatus is provided for reducing a signaling overhead in routing area update performed by a mobile station in a mobile communication system. The method includes grouping cells of the mobile communication system into predetermined cell groups by the network entity, wherein each of the predetermined cell groups is a minimum unit for routing area update; determining cell group identifiers of the cell groups by the network entity; and determining metric information for determining a shape of the routing area by the network entity.

24 Claims, 4 Drawing Sheets

METHOD AND APPARATUS FOR MANAGING ROUTING AREA IN MOBILE COMMUNICATION SYSTEM

PRIORITY

This application claims the benefit under 35 U.S.C. §119 (a) of a Korean Patent Application entitled "Method And Apparatus For Managing Routing Area In Mobile Communication System" filed in the Korean Intellectual Property Office on Feb. 7, 2006 and assigned Serial No. 2006-11896, the contents of which are hereby incorporated by reference.

BACKGROUND OF THE INVENTION

1. Field of the Invention

The present invention relates to a method and apparatus for managing a routing area in a mobile communication system, and in particular, to a method and apparatus for managing a routing area in a third generation (3G) mobile communication system and a 3G Long Term Evolution (LTE) communication system.

2. Description of the Related Art

In general, a wireless communication system refers to a system developed in preparation for a case where it is impossible to connect a fixed wire network up to a mobile station. Such wireless communication systems include a wireless Local Area Network (LAN), a Wireless broadband (Wibro) system, a Mobile Ad Hoc network, etc. as well as typical mobile communication systems for providing voice and data services. The mobile communication is intended to enable a subscriber to perform the communication while the subscriber moves at a high speed in a wide area. One representative mobile communication system is a cellular system. In the cellular system, which overcomes both the limit in the service area and subscriber accommodating capability of conventional mobile communication systems, a service area is divided into a plurality of small sections, that is, cells, and two cells located sufficiently far from each other use the same frequency band, thereby spatially reusing of the frequency band. From among such cellular systems, analog type systems, such as Advanced Mobile Phone System (AMPS) and Total Access Communication Services (TACS), have appeared for the first time, and are generally called $1^{st}$ generation mobile communication systems.

Unfortunately, with $1^{st}$ generation mobile communication systems, it has become difficult to support the rapidly increasing number of mobile communication service subscribers. Furthermore, along with recent technological developments, requirements for various services have increased beyond the initial voice service. As a result, $2^{nd}$ generation mobile communication systems having a digital scheme and being more advanced than $1^{st}$ generation mobile communication systems, have appeared. In a $2^{nd}$ generation mobile communication system, a voice signal (analog signal) is digitalized (voice encoding) and is then subjected to digital modulation/demodulation, and uses a transmission frequency band of 800 MHz. Furthermore, multiple access schemes were developed and used in $2^{nd}$ generation mobile communication systems, such as Time Division Multiple Access (TDMA) or Code Division Multiple Access (CDMA) scheme. Here, the $2^{nd}$ generation mobile communication system provides a voice service and a low speed data service, and includes systems of IS-95 (CDMA scheme) and IS-54 (TDMA scheme) of USA and systems of Global System for Mobile (GSM) communication scheme.

Further, the Personal Communication Services (PCS) system is classified as a $2.5^{th}$ generation mobile communication system and uses a frequency of 1.8~2 GHz band. The $2^{nd}$ generation mobile communication systems have been constructed in order to increase the efficiency of the mobile communication system while providing a voice service to users thereof. However, the appearance of the Internet and users' demand for a high speed data service have predicted the appearance of a new wireless platform, which is the $3^{rd}$ generation mobile communication, such as International Mobile Telecommunication (IMT) 2000. Despite such development in the communication technology, it is possible to easily predict saturation of currently used wireless electric wave spectrum in view of the current trend of rapid increase in the wireless communication services. Therefore, there has been a request for development of new wireless communication technology having a superior characteristic in the frequency efficiency. A representative example of such wireless communication technology is a spread spectrum scheme.

In communication according to the spread spectrum scheme, a signal is spread and transmitted with a frequency bandwidth much wider than the frequency bandwidth of the signal itself, and it is difficult to detect the existence of the signal because the signal has a low power density. Furthermore, in order to restore the original by de-spreading the received signal, the receiver must know the exact codes used in the spreading. Therefore, the communication security is ensured, and other external disturbing signals cannot disturb the communication because they are spread during the de-spreading.

In such a $3^{rd}$ generation (3G) mobile communication system, there are, in large part, two methods of constructing a routing area.

The first method is to construct a routing area having a fixed size and a fixed ID by an operator, as used in the current 3G mobile communication system.

The second method is to construct a routing area by flexibly determining the routing area during the routing area update or during attachment of a mobile station by using a radius determining the size of the routing area and a physical location of the cell in which the mobile station is located.

The first method is being used in the current 3G mobile communication system and constructs a routing area having a fixed size defined in advance. However, the first method cannot take the mobility and positional characteristic of a mobile station into account. If a mobile station is located within a vehicle driving in a highway, the mobile station must perform frequent routing area update as the mobile station continuously passes through a plurality of routing areas. In cases where the mobile station has the mobile characteristic as described above, it is possible to reduce the unnecessary signaling overhead for the routing area update by setting the shape of the routing area in consideration of the mobile characteristic of the mobile station.

According to the second method, different routing areas are defined for mobile stations, based on a physical distance value such as a radius from a cell, and a physical location value of the cell in which the mobile station is located. The second method can more flexibly determine the routing area than the first method.

However, a network entity for controlling the mobility of a mobile station, for example, a Serving GPRS Supporting Node (SGSN), must control a routing area constructed by a list of different cells having different sizes for mobile stations. In order to transmit a paging request to a mobile station, the network entity for controlling the mobility of a mobile station must maintain a list for each mobile station, which includes all cells located within a distance of radius R from the mobile station, and then insert the list of all cells included in a corresponding routing area into a paging request message. Otherwise, a Radio Access Network (RAN), such as a Radio Network Controller (RNC), keeps a list for each mobile station, which includes cells belonging to the routing area of the mobile station from among cells controlled by the RNC itself, and broadcasts a paging request message to the corresponding cells.

This method, in which a RAN or a network controls a cell list based on a radius of each mobile station and transmits it through a signaling message as described above, may degrade the capability of the network and the RAN.

SUMMARY OF THE INVENTION

Accordingly, the present invention has been made to solve the above-mentioned problems occurring in the prior art, and the present invention provides a method and apparatus for managing a routing area in a mobile communication system.

Also, the present invention provides a method and apparatus for reducing a signaling overhead in a routing area update performed by a mobile station in a mobile communication system.

According to one aspect of the present invention, there is provided a method for managing a routing area in a mobile communication system including a mobile station and a network entity that manages mobility of the mobile station. The method includes grouping cells of the mobile communication system into predetermined cell groups by the network entity, wherein each of the predetermined cell groups is a minimum unit for routing area update; determining cell group identifiers of the cell groups by the network entity; and determining metric information for determining a shape of the routing area by the network entity.

According to another aspect of the present invention, there is provided a system for managing a routing area in a mobile communication system. The system includes a network entity for grouping cells of the mobile communication system into predetermined cell groups by the network entity, wherein each of the predetermined cell groups is a minimum unit for routing area update, determining cell group identifiers of the cell groups by the network entity, and determining metric information for determining a shape of the routing area by the network entity; and a mobile station for calculating a metric value corresponding to a distance by which the mobile station has moved, by using the cell group identifiers and the metric information by the mobile station, and comparing the calculated metric value with the metric information and performing the routing area update based on a result of the comparison.

According to another aspect of the present invention, there is provided an apparatus for constructing a routing area in a mobile station. The apparatus includes a memory for storing metric information and cell group identifiers of cell groups received from a network entity for managing mobility of a mobile station in a mobile communication system during attachment process of the mobile station, wherein each of the cell groups is a minimum unit for routing area update; a metric value calculator for, when the mobile station has moved to a new cell group, calculating a distance between the new cell group and a cell group stored in the memory before the mobile station moves; and a controller for controlling calculation of the moving distance of the mobile station by the metric value calculator, comparing the calculated metric value with the metric information stored in the memory, and preventing execution of routing area update when the calculated metric value is smaller than the stored metric information.

According to another aspect of the present invention, there is provided a method for constructing a routing area in a mobile station. The apparatus includes receiving metric information for determining a shape of the routing area and cell group identifiers of cell groups from a network entity managing mobility of a mobile station, wherein each of the cell groups is a minimum unit for routing area update; and determining based on the cell group identifiers and the metric information if it is necessary to perform the routing area update.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, exemplary embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention provides three methods for constructing a routing area based on a cell group.

The first method transfers one-dimensional metric information by which a network can determine a routing area range of a mobile station and a cell group identifier of a cell in which a mobile station is located, through a routing area update process or an attachment process of the mobile station.

The second method transfers two-dimensional metric information (reference metric) to a mobile station, by which a network can determine a routing area range of a mobile station and a cell group identifier of a cell in which a mobile station is located, through a routing area update process or an attachment process of the mobile station.

The third method transfers a cell group identifier of a cell in which a mobile station is located and all cell group identifiers included in a routing area range of a mobile station to the mobile station by a network, through a routing area update process or an attachment process of the mobile station.

First, basic concepts will be defined prior to description of a routing area defining scheme through one-dimensional or two-dimensional metric and list.

Figure 1:
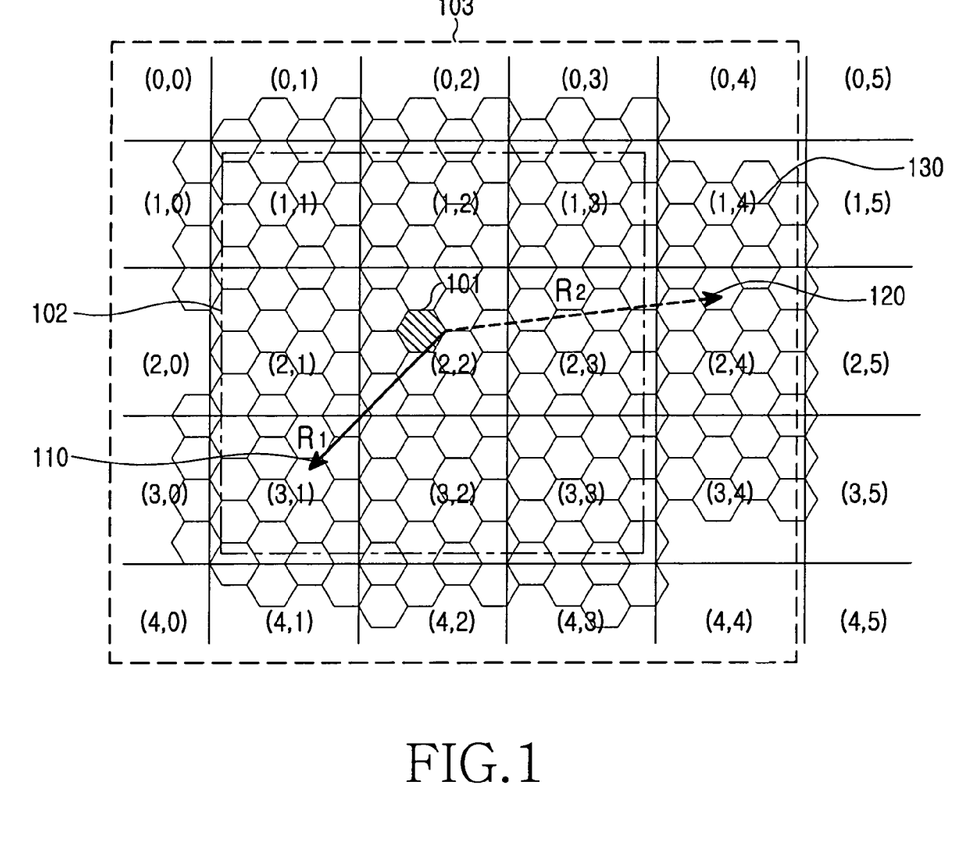
FIG. 1 is a graphic view illustrating a method for routing area update by a mobile station according to a first embodiment of the present invention.
Figure 2:
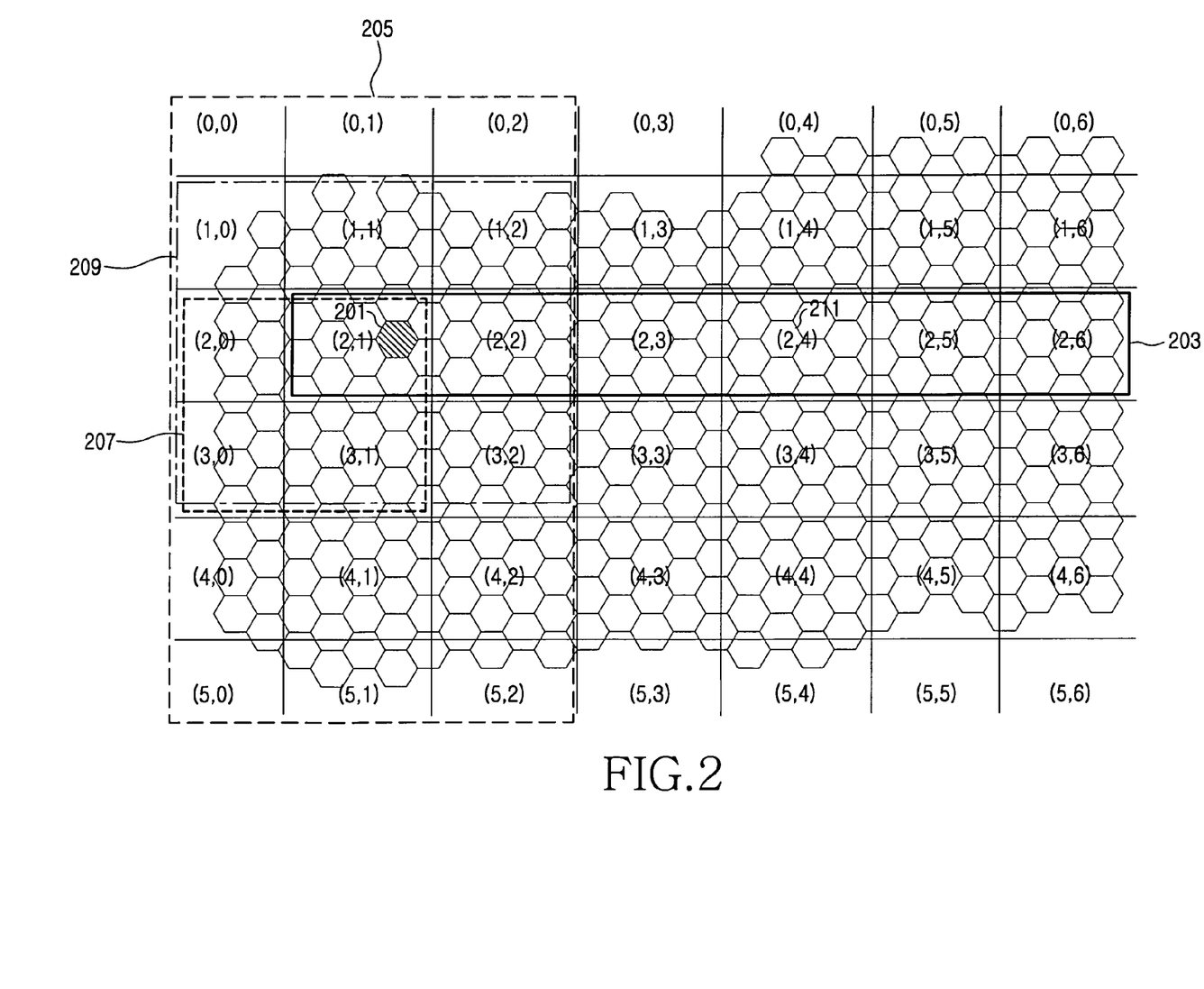
FIG. 2 is a graphic view illustrating a method of routing area update of a mobile station according to a second embodiment of the present invention.

1) Cell group: a cell group having a fixed size or a flexible size is a minimum unit for performing Routing Area Update (RAU) of a mobile station. The cell group includes grids having a fixed size or various sizes and various directionalities (including various grids having inclinations as well as the grids having horizontally or vertically un-inclined directionalities as shown in FIGS. 1 and 2) which are divided from a service network of each service provider by the service provider according to its own policy.

2) Cell group identifier: each cell defined as above is provided a cell group identifier in a form of coordinates (X, Y). In the cell group identifier, the values of X and Y may be defined as positive integers or negative integers.

3) Metric information (=reference metric): in order to express one-dimensional metric from the cell group identifier (X, Y) defined above, a positive integer indicating the metric from the identifier (X, Y) is used. Or, in order to express two-dimensional metric, a positive integer or a negative integer, which simply indicates the positive directionality or negative directionality, is used. Also, it is possible to construct a more flexible routing area by expressing a range using all metrics in four directions including upward, downward, leftward, and rightward from a centered cell group identifier (X, Y) (for example, from −1 to +5 in the vertical direction and from −2 to +3 in the horizontal direction). Further, as used herein, the metric information and the reference metric are understood as having the same meaning.

4) Routing area: in the present invention, the routing area used as a unit for paging and routing area update of a mobile station in an idle state is defined to have different sizes and different shapes according to mobile stations and according to cell groups.

5) Metric value: when a mobile station has moved, it is possible to obtain a metric value for a logical distance by which the mobile station has moved, by applying the Pythagorean theorem to the cell group identifier of the cell group into which the mobile station has moved and the cell group identifier which the mobile station stored before the movement (i.e. metric value$^2$=(X−X1)$^2$+(Y−Y1)$^2$). This metric value is compared with metric information, which corresponds to the routing area information stored in a memory of the mobile station, in order to determine if it is necessary to perform the routing area update.

FIG. 1 is a graphic view illustrating a method for routing area update by a mobile station according to a first embodiment of the present invention.

A network (not shown) according to the first and second embodiments of the present invention transfers one-dimensional metric (R) or two-dimensional metric (R1, R2) including Range 1 of the horizontal direction and Range 2 of the vertical direction to a mobile station during the Routing Area Update (RAU) or during the attachment process.

In the RAU method, according to the first embodiment of the present invention, the mobile station determines a routing area based on cell group identifier [X, Y] and metric information R received during the attachment process of the mobile station. The mobile station transmits a Routing Area ID (RAID) including an ID of a previous cell group together with an ID of the mobile station to a network entity controlling its mobility when the mobile station performs the attachment operation or the routing update operation.

In FIG. 1, the mobile station is currently located in the cell at the position 101, and the position 101 indicates a cell group having coordinates (2, 2). When the mobile station attaches to the position 101 or while the mobile station initially performs routing area update to the routing area to which the cell at the position 101 belongs, the mobile station is allocated a metric (R1) 110 and coordinates (2, 2), which correspond to a group identifier of the group to which the cell at the position 101 belongs, from a network entity (not shown) controlling the mobility of the mobile station.

From among the two types of information (metric information R1 and the cell group identifier), the metric information (R1) 110 has a value determining the size of the routing area of the mobile station. That is, the mobile station has a routing area 102 including cell groups indicated by all logical coordinates [1, 2], [1, 3], [2, 1], [2, 2], [2, 3], [3, 1], [3, 2], and [3, 3] located within the range of the metric (R1) 110 of FIG. 1. Therefore, when the mobile station moves between the cell groups belonging to a range of metric information R1 from the coordinates [2, 2] 101, the mobile station does not perform the routing area update. As described above, by determining the routing area through flexible adjustment of the metric (R) in consideration of environmental situations, performance of the base station, the mobility of the mobile station, etc. in a network (not shown), it is possible to allocate an optimum Routing Area (RA) for the mobile station.

During the routing area update or the attachment process of a mobile station, the mobile station can transmit its own mobility status through a base station to a network entity controlling the mobility of the mobile station. The information transmitted by the mobile station to the network entity may be either simple bit type information in the form of on/off, which can inform that the mobile station is currently moving or stopped, or status information such as the mobility speed of the mobile station, by which a network entity controlling the mobility of the mobile station can measure the mobility status of the mobile station, or information about a preferred Routing Area (RA) size determined by the mobile station based on the status of the mobile station measured by the mobile station itself. Based on such information, the network entity determines the routing area size of a corresponding mobile station and transmits to the mobile station the metric (R) together with a cell group identifier of a cell group including the cell to which the mobile station currently belongs.

Hereinafter, such a process will be described in detail with reference to FIG. 1.

For example, it is assumed in FIG. 1 that the mobile station has attached to the cell 101 and has received the metric information (R1; R1=2 in this example) 110, which is information indicating the routing area 102, and the cell group identifier [X, Y] 101 ([X, Y]=[2, 2] in this example).

Under such an assumption, when the mobile station moves to a cell group having coordinates [3, 1] of FIG. 1, the mobile station receives system information from base stations belonging to a cell group corresponding to the coordinates [3, 1], wherein the mobile station obtains the coordinates [3, 1], which is the current position of the mobile station, from the system information. The mobile station calculates the distance between the coordinates [3, 1] and the coordinates [2, 2] at the position 101 stored during the previous attachment process (or the routing area update process).

In the following description, it is defined that $[X_1, Y_1]$ is the cell group identifier before the movement of the mobile station and $[X_2, Y_2]$ is the cell group identifier after the movement of the mobile station.

Cell group identifier $[X_1, Y_1]$=[2, 2]

Cell group identifier after the movement of the mobile station $[X_2, Y_2]$=[3, 1]

Metric information (=reference metric R) for the routing area=2

Metric value (M) for the current position of the mobile station:

$$M=\sqrt{|X_1-X_2|^2+|Y_1-Y_2|^2}=\sqrt{|2-3|^2+|2-1|^2}=\sqrt{2}$$

Routing area comparison: reference metric R>M (2>√2)

Here, the mobile station has moved within the current routing area range (R=2) of the mobile station, and thus the mobile station does not perform the RAU.

In contrast, when the mobile station has moved to a cell group having the coordinates [1, 4] in FIG. 1, the distance between the coordinates [2, 2] and the coordinates [1, 4] is calculated in the following manner.

Cell group identifier $[X_1, Y_1]$=[2, 2]

Cell group identifier after the movement of the mobile station $[X_2, Y_2]$=[1, 4]

Reference metric R for the routing area=2

Metric value (M) for the current position of the mobile station:

$$M=\sqrt{|X_1-X_2|^2+|Y_1-Y_2|^2}=\sqrt{|2-1|^2+|2-4|^2}=\sqrt{5}$$

Routing area comparison: reference metric R<M (2<√5)

Here, the mobile station has moved out of the current routing area range (R=2) of the mobile station, and the mobile station needs to perform the RAU. Therefore, the mobile station performs RAU into the cell group located at the coordinates [1, 4] 130.

As described above, the metric R has a value determining the size of the routing area. Therefore, when the mobile station is in an idle state or has a wide range for its movement, it is possible to reduce the RAU overhead for a mobile station having a large mobility by setting the metric to be large.

FIG. 2 is a graphic view illustrating a method of routing area update of a mobile station according to a second embodiment of the present invention.

In the routing area update according to the second embodiment of the present invention, the RA is determined based on metric coordinates (R1, R2), which correspond to range-based metric information. In FIG. 2, the mobile station is located within a cell 201. It is assumed that the mobile station has attached to the cell 201 for the first time or has moved to the cell 201 and is trying to attach to the network through routing area update. Through the attachment process or the RAU process to the cell 201, the mobile station receives the coordinates of the cell group, to which the cell 201 belongs, and metric (R1, R2), which is metric information indicating two-dimensional range for determining the routing area. In FIG. 2, moreover, reference numerals 203, 205, 207, and 209 denote ranges of the RA, respectively.

Hereinafter, a method for setting metric for indicating the range of the RA by using reference numerals 203, 205, 207, and 209 according to according to the second embodiment of the present invention will be described.

First, in the case of reference numeral 203, the metric information is set to have metric (R1, R2)=(5, 0), which has a horizontal range of 5 (R1=5) and a vertical range of 0 (R2=0). According to another type of expression, this metric information may be set to have metric (R1, R2)=(6, 1). The routing area having the shape as designated by reference numeral 203 may be useful for the cases having a narrow long terrestrial characteristic, such as a highway, etc. Thereafter, when the mobile station moves into a cell group at the position [2, 4] 211, which is within the range of metric (5, 0), including the cell groups having coordinates of [2, 1], [2, 2], [2, 3], [2, 4], [2, 5], and [2, 6], the mobile station does not perform RAU.

Conversely, if the mobile station moves vertically from cell groups having coordinates of [2, 1]→[3, 1]→[2, 2]→[3, 2]→ . . . , it is possible to change the metric information for the RA of the mobile station to (5, -1) by reporting information about the mobility of the mobile station or an indication having a special meaning to the network. By setting an optimum routing area on the average through the operation of the mobile station and network using the cell group and the metric (R1, R2), it is possible to minimize the quantity of control messages (e.g. routing area update, paging, etc.) for the mobile station in the network.

In the case of reference numeral 205, the horizontal metric parameter R1 has a value between -1 and 1 (-1≦R1≦1) and the vertical metric parameter R2 has a value between -3 and 2 (-3≦R1≦2), and thus the metric (Rx1, Rx2, Ry1, Ry2) has a value of (-1, 1, -3, 2) (according to another type of expression, this metric may be expressed to have a value of (-2, 2, -4, 3). The RA as designated by reference numeral 205 is useful for in cases where the mobile station actively moves in various directions, especially in the vertical direction).

In the case of reference numeral 207, the horizontal metric parameter R1 has a negative value (R1=-1) and the vertical metric parameter R2 also has a negative value (R2=-1), and thus the metric (R1, R2) has a value of (-1, -1) (according to another type of expression, this metric may be expressed to have a value of (-2, -2). The RA as designated by reference numeral 207 is useful in cases where the mobile station does not move relatively actively. For example, when the mobile station is in an idle state, the RA as designated by reference numeral 207 can reduce the range within which the network must transmit a paging request message, thereby reducing the waste of network resources.

Differently from the metric (R1, R2) 205 having different ranges in the positive direction and negative direction, it is possible to construct an RA having a square shape as designated by reference numeral 209, which includes metric parameters R1 and R2 having the same size in the positive direction and the negative direction (for example, -1≦R1≦1 and -1≦R2≦1) when the metric coordinates are expressed as (R1, R2)=(1, 1).

As described above, in cases involving reference numerals 203, 205, 207, and 209, the network determines metric (R1, R2) and an identifier (X1, Y1) of a cell group, in which a mobile station is currently located, based on messages such as attachment request or routing area update request from a mobile station, and then transmits the metric and identifier to the mobile station, thereby defining the routing area and the paging area for the routing area update and the paging.

In addition to the method of expressing the routing area by using the cell group identifier and metric as shown in FIGS. 1 and 2, it is possible to transmit all cell group identifiers belonging to the RA of the mobile station to the mobile station during the attachment process or the routing area update of the mobile station. This method cannot support the flexibility obtainable by the metric. However, this method, by expressing the routing area by the cell group unit, can reduce the load of managing the routing area to the mobile station and the network, in comparison with the method of managing the routing area by the cell unit.

As described above, the metric information is given as one-dimensional information in the first embodiment of the present invention and as two-dimensional information in the second embodiment of the present invention.

Figure 3:
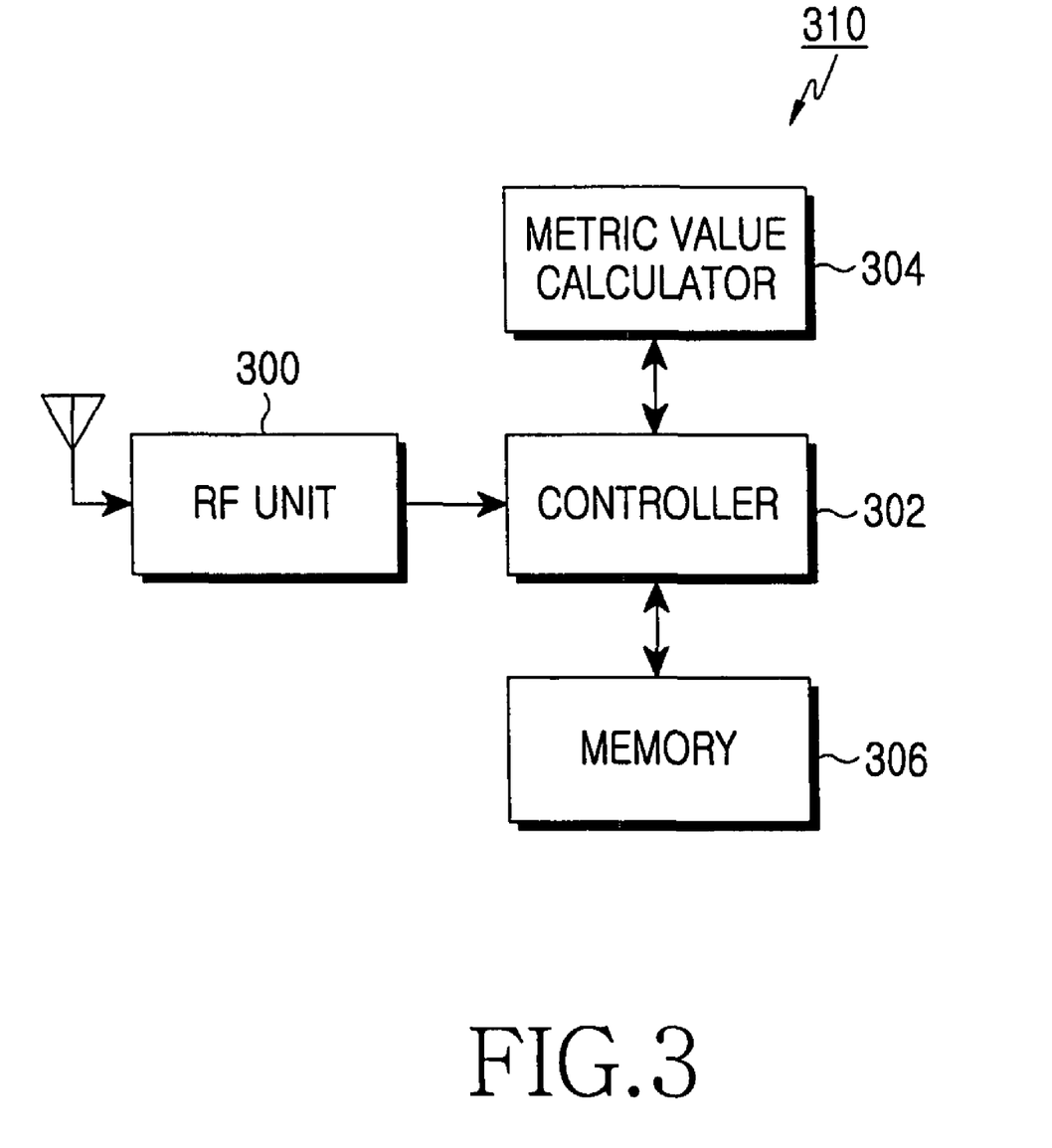
FIG. 3 is a schematic diagram of a mobile station 310 according to an embodiment of the present invention.

FIG. 3 is a block diagram of a mobile station 310 according to an embodiment of the present invention.

Here, Radio Frequency (RF) unit 300 performs transmission/reception of voice data, text data, video data, and control data under the control of a controller 302. As such, the RF unit 300 includes an RF transmitter for up-converting a frequency of an outgoing signal and amplifying the outgoing signal, and for low noise-amplifying an incoming signal and down-converting the frequency of the incoming signal.

According to the first embodiment of the present invention, a metric value calculator 304 calculates a metric value for the position of the mobile station by using coordinates before the movement and coordinates after the movement under the control of the controller 302. According to the second embodiment of the present invention, the metric value calculator 304 calculates a metric value for the position of the mobile station 310 based on two-dimensional metric information of the mobile station 310 in the vertical and horizontal directions under the control of the controller 302.

The controller 302 collects and stores system information received through the RF unit 300, such as the moving speed of the mobile station and the cell information (for example, cell group coordinates, metric information (reference metric), etc.), transmits the collected information to the metric value calculator 304, receives the value calculated by the metric value calculator 304 and determines if it is necessary to perform the routing area update for a corresponding mobile station, generates a control message for the routing area update when the routing area update is necessary and transmits the generated control message through a base station to a network entity controlling the mobility of the mobile station, and processes a response message to the routing area update message received from the network entity.

The memory 306 supports information and processing necessary for the operation performed by the controller 302 and stores the system information.

Further, the memory 306 stores the metric and cell group identifier information and the metric value calculated by the distance calculator 304 under the control of the controller 302.

Figure 4:
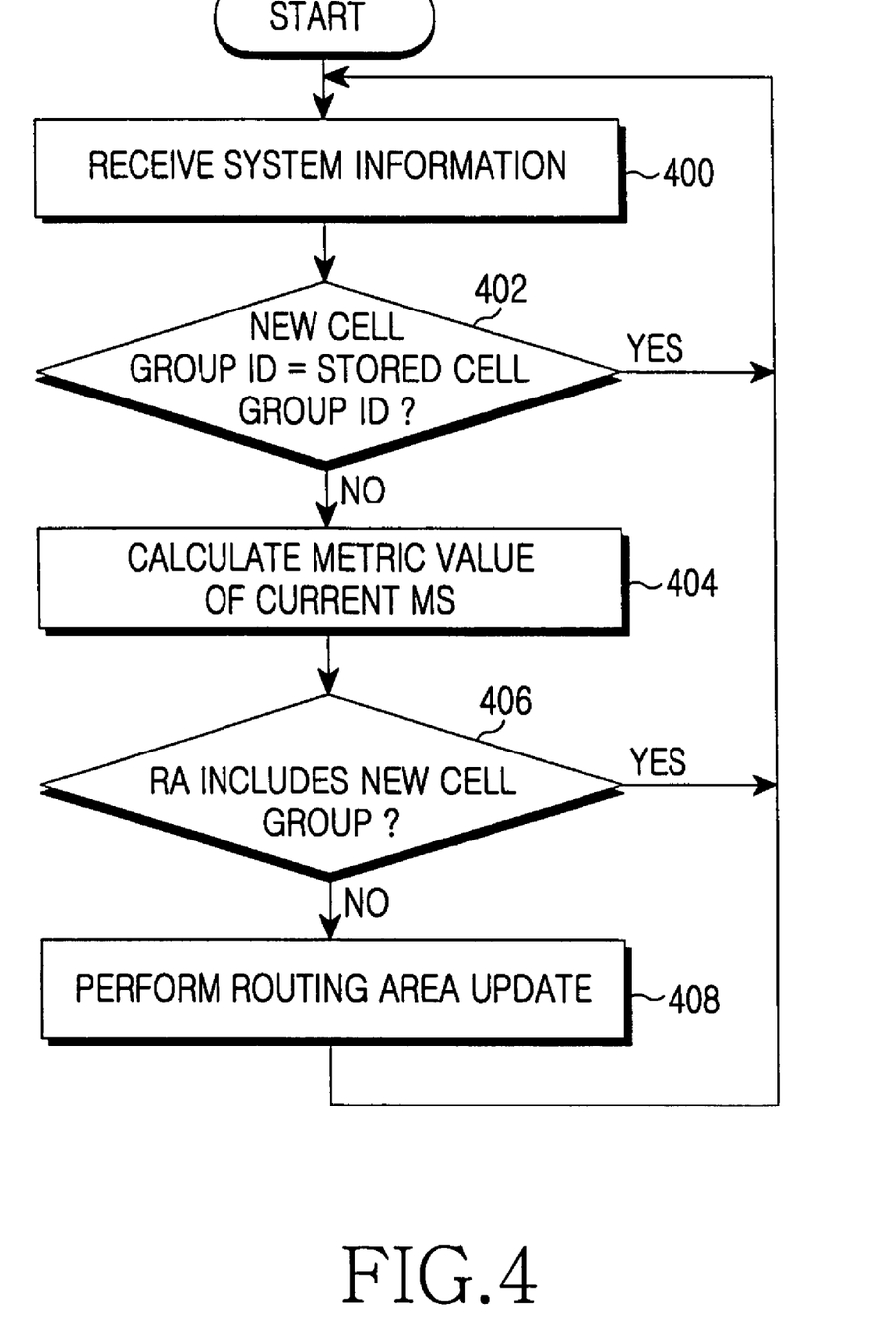
FIG. 4 is a flow diagram of a process for performing routing area update by a mobile station according to an embodiment of the present invention.

FIG. 4 is a flow diagram of a process for performing routing area update by a mobile station according to an embodiment of the present invention.

First, in step 400, the controller 302 periodically receives new system information from the network. The system information includes metric information and a cell group identifier of a corresponding cell. The metric information may have either a one-dimensional value or a two-dimensional value as described above.

Then, in step 402, the controller 302 compares a cell group identifier in the newly received system information with the cell group identifier currently stored in the memory 306.

As a result of the determination in step 402, when the cell group identifier in the newly received system information is different from the cell group identifier currently stored in the memory 306, the controller 302 proceeds to step 404 in which the controller 302 measures a metric value for the current position of the mobile station by using the cell group identifiers currently stored in the memory 306 and the newly received cell group identifiers.

Then, in step 406, the controller 302 determines if the new cell group belongs to its own routing area. As a result of the determination, when the new cell group does not belong to the routing area, the controller 302 proceeds to step 408 in which the controller performs a series of operations for the routing area update, for example, it transmits a routing area update message and receives a response message thereof. In contrast, when the determination in step 406 concludes that the new cell group belongs to its own routing area, the controller 302 returns to step 400 and repeats the process from step 400.

As discussed above with the first embodiment and the second embodiment, the present invention defines a routing area based on one-dimensional or two-dimensional metric information, which is defined in consideration of cell groups having flexible sizes and characteristics (mobility, power consumption, geographical status, etc.) of a mobile station in relation to such cell groups.

The present invention can reduce signaling overhead for routing area update by a mobile station and overhead due to management of a cell list for paging in a network.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for managing a Routing Area (RA) in a mobile communication system including a mobile station and a network entity that manages mobility of the mobile station, the method comprising the steps of:
grouping cells of the mobile communication system into predetermined cell groups by the network entity, wherein each of the predetermined cell groups is a minimum unit for routing area update;
determining cell group identifiers of the cell groups by the network entity;
determining metric information for determining a shape of the routing area by the network entity;
calculating, by the mobile station, a metric value corresponding to a distance by which the mobile station has moved, by using the cell group identifiers;
comparing the calculated metric value with the metric information;
performing, by the mobile station, the routing area update when the calculated metric value is larger than the metric information; and
preventing, by the mobile station, execution of the routing area update when the calculated metric value is less than or equal to the stored metric information,
wherein the determined cell group identifiers and the determined metric information are transmitted to the mobile station by the network entity,
wherein the metric information includes a one-dimensional metric from a cell group identifier or a two-dimensional metric from the cell group identifier, and
wherein when the mobile station has moved, the metric value is calculated by using the cell group identifier of the cell group into which the mobile station has moved and the cell group identifier which was stored in the mobile station before the mobile station moved.

2. The method as claimed in claim 1, wherein the metric information is determined by a size and a direction of the routing area.

3. The method as claimed in claim 1, wherein the metric information is determined in consideration of mobility of the mobile station.

4. The method as claimed in claim 1, wherein the comparing step further comprises:
(a) calculating the distance by which the mobile station has moved, by using a cell group identifier received from the network entity and a cell group identifier received after movement; and
(b) comparing the calculated distance with the metric information and performing the routing area update when the calculated distance is larger than the metric information.

5. The method as claimed in claim 4, wherein the routing area update is not performed when the calculated distance is less than or equal to the metric information.

6. The method as claimed in claim 4, wherein step (a) comprises:
   calculating a metric value by using a cell group identifier of a cell group in which the mobile station has moved and a cell group identifier stored in advance by the mobile station; and
   calculating the distance by using the calculated metric value.

7. The method as claimed in claim 1, further comprising transmitting an identifier of the mobile station and a routing area identifier comprising a previous cell group identifier when the mobile station attaches to the network entity.

8. The method as claimed in claim 1, further comprising a step of transmitting an identifier of the mobile station and a routing area identifier including a previous cell group identifier when the mobile station transmits a request for the routing area update to the network entity.

9. A system for managing a Routing Area (RA) in a mobile communication system, the system comprising:
   a network entity for grouping cells of the mobile communication system into predetermined cell groups by the network entity, wherein each of the predetermined cell groups is a minimum unit for routing area update the network entity, determining cell group identifiers of the cell groups, and the network entity determining metric information for determining a shape of the routing area; and
   a mobile station for calculating a metric value corresponding to a distance by which the mobile station has moved, by using the cell group identifiers by the mobile station, and comparing the calculated metric value with the metric information and performing the routing area update based on a result of the comparison,
   wherein the mobile station calculates the distance by which the mobile station has moved, by using a cell group identifier received from the network entity and a cell group identifier received after movement, compares the calculated distance with the metric information received from the network entity, performs the routing area update when the calculated distance is larger than the metric information and prevents execution of the routing area update when the calculated metric value is less than or equal to the stored metric information,
   wherein the metric information includes a one-dimensional metric from a cell group identifier or a two-dimensional metric from the cell group identifier, and
   wherein when the mobile station has moved, the metric value is calculated by using the cell group identifier of the cell group into which the mobile station has moved and the cell group identifier which was stored in the mobile station before the mobile station moved.

10. The system as claimed in claim 9, wherein the metric information is determined by a size and a direction of the routing area.

11. The system as claimed in claim 9, wherein the metric information is determined in consideration of mobility of the mobile station.

12. The system as claimed in claim 9, wherein the mobile station does not perform the routing area update when the calculated distance is less than or equal to the metric information.

13. The system as claimed in claim 9, wherein the mobile station calculates a metric value by using a cell group identifier of a cell group in which the mobile station has moved and a cell group identifier stored in advance by the mobile station, calculates the distance by using the calculated metric value, and performs the routing area update when the distance exceeds the reference metric.

14. The system as claimed in claim 9, wherein the mobile station transmits an identifier of the mobile station and a routing area identifier including a previous cell group identifier when the mobile station attaches to the network entity.

15. The system as claimed in claim 14, wherein the mobile station transmits an identifier of the mobile station and a routing area identifier including a previous cell group identifier when the mobile station transmits a request for the routing area update to the network entity.

16. An apparatus for constructing a Routing Area (RA) in a mobile station, the apparatus comprising:
   a memory for storing metric information and cell group identifiers of cell groups received from a network entity for managing mobility of a mobile station in a mobile communication system during an attachment process of the mobile station, wherein each of the cell groups is a minimum unit for routing area update;
   a metric value calculator for, when the mobile station has moved to a new cell group, calculating a distance between the new cell group and a cell group stored in the memory before the mobile station moves; and
   a controller for controlling calculation of the moving distance of the mobile station by the metric value calculator, comparing the calculated metric value with the metric information stored in the memory, performing execution of the routing area update when the calculated metric value is larger than the stored metric information, and preventing execution of the routing area update when the calculated metric value is less than or equal to the stored metric information,
   wherein the metric information includes a one-dimensional metric from a cell group identifier or a two-dimensional metric from the cell group identifier, and
   wherein when the mobile station has moved, the metric value is calculated by using the cell group identifier of the cell group into which the mobile station has moved and the cell group identifier which was stored in the mobile station before the mobile station moved.

17. The apparatus as claimed in claim 16, wherein the metric information is determined by a size and a direction of the routing area.

18. The apparatus as claimed in claim 16, wherein the metric information is determined in consideration of mobility of the mobile station.

19. The apparatus as claimed in claim 16, wherein the mobile station receives the metric information and the cell group identifiers during the routing area update.

20. A method for constructing a Routing Area (RA) in a mobile station, the method comprising:
   (1) receiving, by the mobile station, metric information for determining a shape of the routing area and cell group identifiers of cell groups from a network entity managing mobility of a mobile station, wherein each of the cell groups is a minimum unit for routing area update; and
   (2) determining, by the mobile station, based on the cell group identifiers and the metric information if it is necessary to perform the routing area update,
   wherein step (2) further comprises:
   (a) calculating a metric value corresponding to a distance by which the mobile station has moved, by using the cell group identifiers and the metric information;
   (b) comparing the calculated metric value with the metric information; and (c) performing the routing area update when the calculated metric value is larger than the metric information; and
(d) preventing execution of routing area update when the calculated metric value is less than or the equal to the metric information,
wherein the metric information includes a one-dimensional metric from a cell group identifier or two-dimensional metric from the cell group identifier, and
wherein in case the mobile station has moved, the metric value is calculated by using the cell group identifier of the cell group into which the mobile station has moved and the cell group identifier which was stored in the mobile station before the mobile station moved.

21. The method as claimed in claim 20, wherein the routing area update is not performed when the calculated distance is less than or equal to the metric information.

22. The method as claimed in claim 20, wherein step (a) further comprises calculating the distance by which the mobile station has moved, by using a cell group identifier received when the mobile station attaches to the network entity and a cell group identifier received after movement.

23. The method as claimed in claim 20, wherein the metric information is determined by a size and a direction of the routing area.

24. The method as claimed in claim 20, wherein the metric information is determined in consideration of mobility of the mobile station.

* * * * *